(12) United States Patent
Lefebvre

(10) Patent No.: US 7,643,592 B2
(45) Date of Patent: Jan. 5, 2010

(54) ELECTRONIC DEVICE FOR GENERATING SECURE SYNCHRONIZATION SIGNALS

(75) Inventor: Patrick Lefebvre, Longpont sur Orge (FR)

(73) Assignee: Thales (FR)

( * ) Notice: Subject to any disclaimer, the term of this patent is extended or adjusted under 35 U.S.C. 154(b) by 508 days.

(21) Appl. No.: 11/571,209

(22) PCT Filed: Jun. 17, 2005

(86) PCT No.: PCT/EP2005/052829

§ 371 (c)(1),
(2), (4) Date: Dec. 22, 2006

(87) PCT Pub. No.: WO2005/124947

PCT Pub. Date: Dec. 29, 2005

(65) Prior Publication Data

US 2007/0242787 A1    Oct. 18, 2007

(30) Foreign Application Priority Data

Jun. 22, 2004    (FR) .................................. 04 06782

(51) Int. Cl.
*H04L 7/00* (2006.01)
(52) U.S. Cl. ..................................... 375/354
(58) Field of Classification Search ................. 375/354, 375/357, 369, 372, 373, 374; 370/395.62, 370/507; 455/265; 702/89; 713/375, 400; 385/14

See application file for complete search history.

(56) References Cited

U.S. PATENT DOCUMENTS

| 3,346,741 | A | 10/1967 | Mayer et al. |
| 6,282,210 | B1 | 8/2001 | Rapport et al. |
| 7,529,435 | B2 * | 5/2009 | West et al. .................... 385/14 |
| 2001/0010003 | A1 | 7/2001 | Lai |

FOREIGN PATENT DOCUMENTS

EP    0 652 642 A    5/1995

* cited by examiner

*Primary Examiner*—Sam K Ahn
(74) *Attorney, Agent, or Firm*—Lowe Hauptman Ham & Berner, LLP

(57) ABSTRACT

An electronic device for generating secure synchronization signals operating with an external clock emitting a first frequency signal is such that for very high resolution synchronization signals, the temporal accuracy of the signals is less than a nanosecond, thereby enabling different elements of a laser pulse chain to be synchronized. The device is provided with securing means having an internal clock emitting an internal clock signal oscillating at a second frequency roughly identical to the first frequency, wherein electronic security management means is arranged so that the internal clock signal replaces the external clock signal and security measures are triggered when the external clock signal is lost, thereby causing the partial or complete stop of the device to be synchronized.

1 Claim, 3 Drawing Sheets

ELECTRONIC DEVICE FOR GENERATING SECURE SYNCHRONIZATION SIGNALS

CROSS-REFERENCE TO RELATED APPLICATIONS

The present Application is based on International Application No. PCT/EP2005/0528929, filed on Jun. 17, 2005, which in turn corresponds to French Application No. 04/06782 filed on Jun. 22, 2004, and priority is hereby claimed under 35 USC § 119 based on these applications. Each of these applications are hereby incorporated by reference in their entirety into the present application.

BACKGROUND OF THE INVENTION

1. Field of the Invention

The field of the invention is that of electronic devices for generating synchronization signals. More specifically, the technical field is that of very high resolution synchronization signals, the temporal accuracy of the signals being less than a nanosecond. These devices are in particular used in the laser subsystems that deliver high-energy, ultra-brief laser pulse trains, the duration of the pulses being of the order of a few hundreds of femtoseconds and their energy being of the order of a terawatt.

2. Description of the Invention

These subsystems more often than not comprise a large number of optoelectronic elements needed for generating, amplifying and formatting the laser pulses and elements for controlling, monitoring and measuring these pulses. Now, the pulses emitted are of very brief duration, so it is vitally important to synchronize the various elements of the subsystem with a high temporal accuracy so as to ensure both optimal operation of the subsystem and the best possible reproducibility of the emitted pulses.

The current synchronization devices present a certain number of drawbacks. On the one hand, the internal clock of these various devices is not necessarily perfectly synchronized with an external signal taken from an element of the system to be synchronized. On the other hand, when the system comprises a large number of elements to be synchronized it becomes impossible to synchronize them all with a single synchronization device. In this case, several synchronization devices are used, these devices being synchronized between themselves by trigger devices. These triggers are produced from clock signals internal to the synchronization devices. These clock signals are periodic. It can be demonstrated that the triggering accuracy is equal to a period of the clock signal. For example, for a clock signal emitted at a frequency of 100 megahertz, the synchronization accuracy is then equal to one period, or 10 nanoseconds. This accuracy is not sufficient, for certain applications, to permit a perfect synchronization of the various elements of the system.

To overcome these drawbacks, the device can operate no longer with an internal clock but with an external clock taken from the device to be synchronized. Thus, any temporal drift and any triggering inaccuracy of the synchronization signals is avoided. However, this solution presents the drawback that, if the external signal disappears, the entire synchronization devices can no longer function. The disappearance of the synchronization signals can then have serious consequences. In practice, the breakdown of the external clock signal is the manifestation of a malfunction of the system to be synchronized. For some applications, in particular in pulsed laser subsystems, it is important to take measures to protect the elements of the subsystem that can be damaged by this malfunction. Such is the case in particular with power amplifiers which must operate only in the presence of the laser beam to be amplified.

The device according to the invention comprises a security device for compensating for the malfunctions of the external clock by the provision of an internal clock which takes over from the external clock in the event of a malfunction. The device also comprises electronic management means for continuing to manage the system to be synchronized and so prevent elements from being damaged.

SUMMARY OF THE INVENTION

More specifically, the subject of the invention is an electronic device for generating synchronization signals from a first external clock signal emitted at a first oscillation frequency, said signal being supplied to an input called a clock input, characterized in that said device comprises at least:

an internal clock emitting an internal clock signal oscillating at a second frequency roughly identical to the first frequency;

first electronic security management means, arranged so that said internal clock signal replaces the external clock signal if the latter malfunctions.

Advantageously, the first electronic security management means allow for the preprogrammed application or stopping of certain synchronization signals in the event of loss of the external clock signal. Furthermore, the device comprises second electronic means of controlling external electronic devices, of electrical power supply device type or of electromechanical device type or of security system type, said signals being delivered to electronic control outputs, said second means being controlled by the first electronic security management means.

Advantageously, the first security management means include means of switching off all the devices controlled by the synchronization device at the end of a predetermined period following the loss of the external clock signal. The first electronic means mainly comprise a programmable digital component, for example of the FPGA (Fast Programmable Gate Array) type.

The device includes electronic interface means with a microcomputer, said microcomputer making it possible to control and program the functions of the device.

The device according to the invention conventionally comprises:

electronic means of formatting the external clock signal so as to obtain a sinusoidal signal of frequency identical to the first oscillation frequency;

electronic means of generating from said sinusoidal signal:

a first periodic synchronization signal $S_0$ being used as a timebase reference, said signal having a first repetition frequency, said signal being supplied to an electronic output called a reference output.

a plurality of second periodic synchronization signals $S_{SYNC}$, said second signals being offset by a programmable time relative to the first synchronization signal and having second repetition frequencies which are also programmable, said second signals being supplied to electronic outputs called programmed delay signal outputs.

means of generating a second external synchronization clock signal having a frequency identical to the first external clock signal, said signal being supplied to an electronic output called a clock output.

The device according to the invention applies more particularly to a laser subsystem comprising at least the following optoelectronic elements:
- a local oscillator emitting an optical beam in the form of laser pulse trains;
- an energy amplification subsystem;
- means of spatially and temporally formatting the optical beam;
- means of controlling, monitoring and measuring;
- a semi-reflecting optical splitter placed at the output of the local oscillator;
- a photodiode placed on one of the channels of said splitter so as to receive a part of the optical beam, said photodiode delivering an electrical signal representative of said optical beam;
- an electronic device or system for generating synchronization signals according to the invention, the electrical signal taken from the photodiode being used as a clock signal for said device or said system, the synchronization signals $S_{SYNC}$ taken from said device or from said system being used to synchronize the various optoelectronic elements of the subsystem.

BRIEF DESCRIPTION OF THE DRAWINGS

The invention will be better understood and other advantages will become apparent from reading the description that follows, given by way of nonlimiting example and with reference to the appended figures in which.

DETAILED DESCRIPTION OF THE INVENTION

Figure 1:
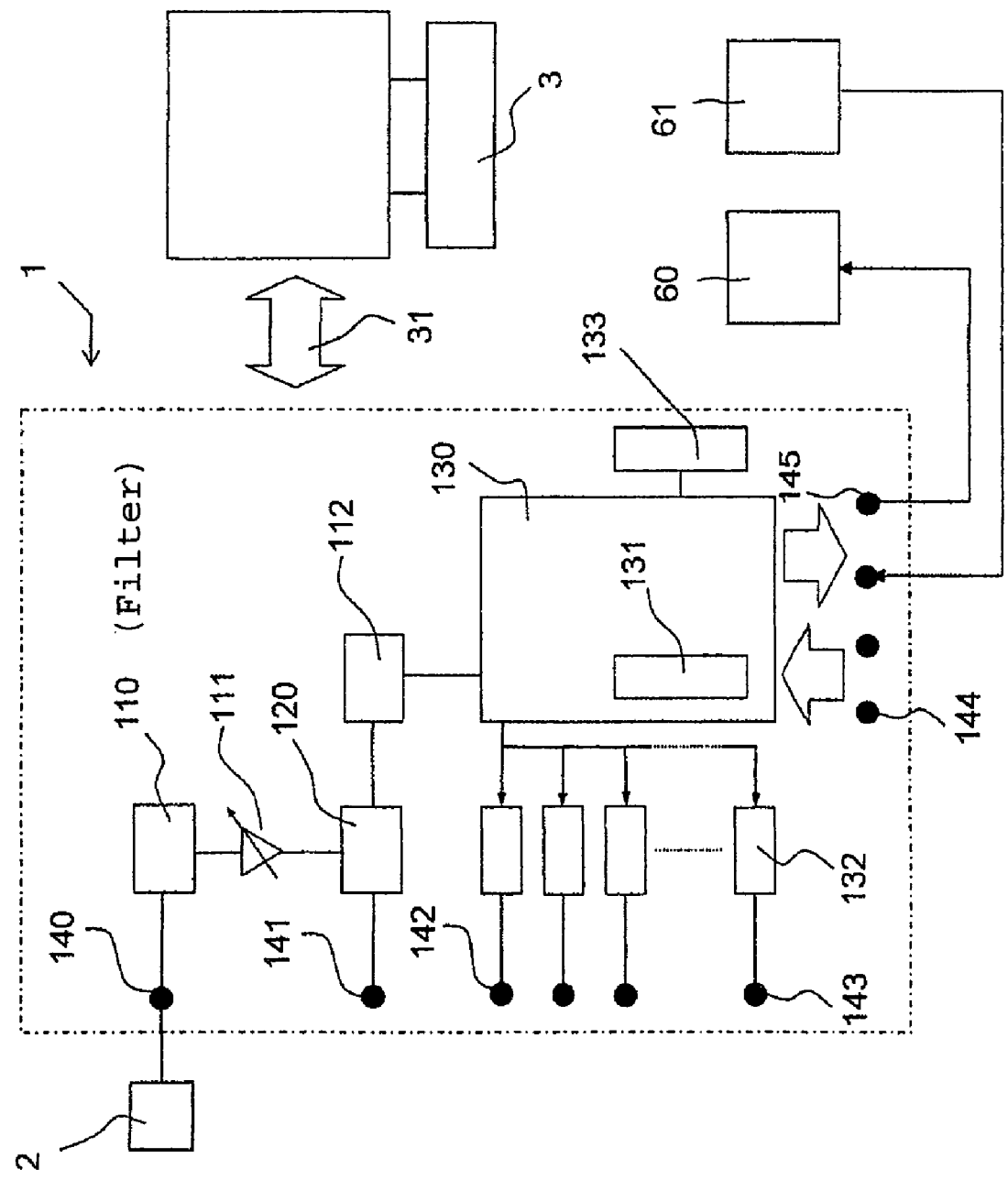
FIG. 1 represents the general block diagram of the device according to the invention.

As a nonlimiting example, FIG. 1 represents an electronic device for generating synchronization signals 1 according to the invention. It mainly comprises:
- electronic means of filtering 110, amplifying 111 and level-setting 112, for formatting an eternal clock signal so as to obtain a positive sinusoidal signal of frequency identical to the first oscillation frequency;
- electronic means 130, 131 and 132 of generating from said sinusoidal signal:
  - a first periodic synchronization signal being used as a timebase reference, said signal having a first repetition frequency, said signal supplied to an electronic output called a reference output 142;
  - a plurality of second periodic synchronization signals, said second signals being offset by a programmable time relative to the first synchronization signal, said second signals being supplied to electronic outputs called programmed delay signal outputs 143;
- an internal clock 133 emitting an internal clock signal oscillating at a second frequency roughly identical to the first frequency;
- electronic security management means 130, arranged so that said internal signal replaces the external clock signal in the event of loss of the latter.
- means 120 of generating a second external synchronization clock signal having a frequency identical to the first external clock signal, said signal being supplied to an electronic output called a clock output 141.
- electronic interface means 31 with a control microcomputer 3, said microcomputer making it possible to control and program all or some of the functions of the device.
- electronic triggering means for synchronizing certain functions of the device from at least one external signal, said signal being supplied to an electronic input called a "trigger" input 144.
- control means for delivering control signals for electronic devices or for electromechanical devices 60 or for receiving control signals coming from security systems 61, said signals being delivered to electronic control outputs 145.

A certain number of electronic or optoelectronic instruments or systems, such as pulsed lasers, deliver a very high-stability clock signal. This clock signal is used to synchronize the various components of the device to be synchronized.

The main function of the electronic means 130, 131 and 132 is to generate from the clock signal the synchronization signals $S_{SYNC}$. The core of these electronic means is formed by a programmable digital component 130 which can be of the FPGA (Fast Programmable Gate Array) type. This digital component generates:
- a first periodic synchronization signal $S_0$ being used as a timebase reference, said signal having a first repetition frequency, said signal supplied to an electronic output called a reference output 142.
- a plurality of second periodic synchronization signals $S_{SYNC}$, said second signals being offset by a programmable time $\delta_M$ relative to the first synchronization signal $S_0$, said second signals being supplied to electronic outputs called programmed delay signal outputs 143, said second signals having second repetition frequencies.

The synchronization signals $S_0$ and $S_{SYNC}$ take the form of identical temporal pulse trains, each pulse having the form of a crenellation, the rising edge M and the falling edge D of said crenellation being offset by a first time $\delta_M$ and a second time $\delta_D$ programmable relative to the rising edge of the corresponding crenellation of the first synchronization signal $S_0$ taken as a reference. The time $T_{SYNC}$ separating two pulses is equal to the inverse of the repetition frequency $f_{SYNC}$ of the synchronization signal $S_{SYNC}$. This repetition frequency $f_{SYNC}$ is adjustable according to the use of the synchronization signal.

The programmable digital component 130 operates at the clock frequency and cannot deliver signals with a temporal resolution greater than the period of said clock frequency. Thus, if the clock frequency is 100 megahertz, the intrinsic resolution of the programmable digital component is 10 nanoseconds. To obtain lower temporal resolutions, there are programmable delay lines 132 at the output of the programmable digital component 130, each of the second synchronization signals $S_{SYNC}$ being taken from these delay lines. There are thus obtained temporal rising and falling edge accuracies of the crenellations well below the temporal period of the external clock. With the preceding example, it is possible to obtain temporal resolutions of the order of 250 picoseconds with an average uncertainty, also called "jitter", of 50 picoseconds.

For reasons of user convenience and ergonomics, the various functions of the device can be monitored by a microcomputer 3 by means of electronic interfaces 31 represented symbolically by the double arrow in FIG. 1. These electronic interfaces 31 can be simple electronic links or be defined according to an electronic standard for the exchange of data between electronic devices such as, for example, the RS 232 standard. The control and monitoring software can be developed using specific software such as measuring instrument monitoring software known by the brand name LABVIEW developed by National Instruments. It is advantageous, when the synchronization device is no longer being monitored by the microcomputer 3, for all the programmed parameters, in particular the various delays governing the synchronization signals, to be retained such that the synchronization device can operate independently. To this end, the programmable digital component has an electronic memory 131.

The synchronization device also comprises an internal clock 133 emitting an internal clock signal oscillating at a second frequency roughly identical to the first frequency and first electronic security management means incorporated in the programmable digital component 130, so that said internal signal replaces the eternal clock signal if the latter disappears. This internal clock is taken from a tunable oscillator which can, for example, be a quartz crystal oscillator.

Figure 2:
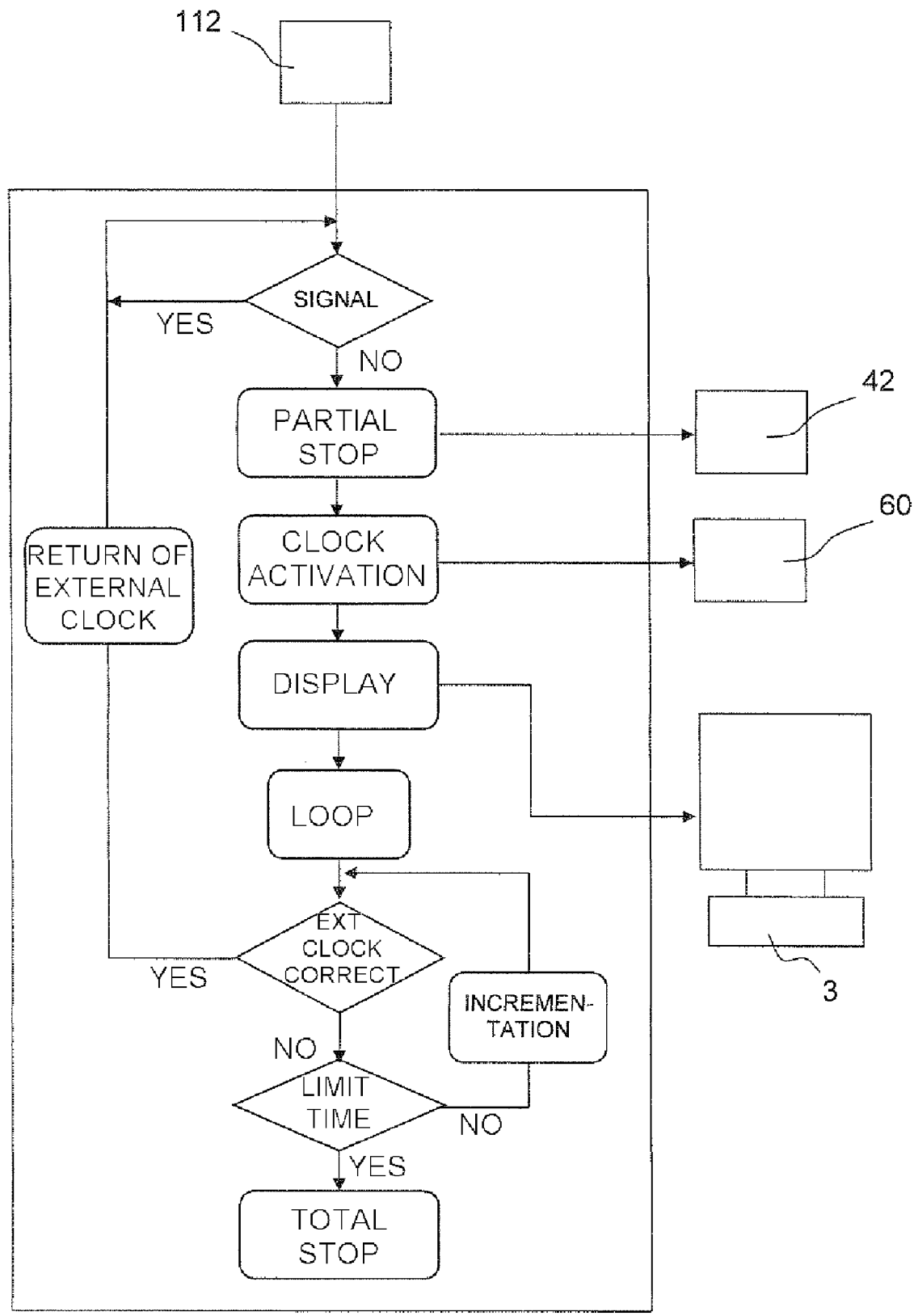
FIG. 2 represents the diagram of the operating protocol of the security device according to the invention.

The operating protocol of the security device according to the invention is described in the diagram of FIG. 2.

The various steps of the protocol are as follows:

The synchronization device delivers an external clock signal formatted and taken from the electronic device 112. This signal is examined by electronic means. The examination of the signal is symbolized by the lozenge entitled "SIGNAL". if the signal is correct, of course, the device continues to operate on the external clock, as symbolized by the "YES" output from the "SIGNAL" lozenge; if the signal is not compliant, as symbolized by the "NO" output from the "SIGNAL" lozenge, the protocol moves on to the next step.

The security device then activates three functions symbolized by the rectangles entitled: "PARTIAL STOP", "CLOCK ACTIVATION" and "DISPLAY", which correspond to the following tasks:

"PARTIAL STOP": the devices presenting a danger or likely to be damaged by a prolonged stoppage are switched off;

"CLOCK ACTIVATION": the internal clock is activated and replaces the external clock so that the synchronization signals essential to the correct operation of the system are again activated correctly;

"DISPLAY": failure messages are displayed on the synchronization device itself via indicating diodes, or on the monitoring microcomputer.

The next step entitled "LOOP" terminates the system securing step;

The next step entitled "EXT. CLOCK CORRECT" verifies that the external signal is restored. If not, the device returns to operating on the external clock signal, as symbolized by the "YES" output from the "EXT. CLOCK CORRECT" lozenge, to the rectangle entitled "RETURN OF EXTERNAL CLOCK"; otherwise, the protocol moves on to the next step;

The next step entitled "LIMIT TIME" verifies that the failure time of the external clock signal is less than a predetermined time.

In the case where the failure time is greater than or equal to this value, as symbolized by the "YES" output from the "LIMIT TIME" lozenge, all the components of the system are stopped, as symbolized by the rectangle entitled "TOTAL STOP". Otherwise, the external clock signal is tested again after an incrementation time, as symbolized by "INCREMENTATION" in the diagram, until either the clock signal is restored, or the maximum duration of the failure time has elapsed.

Figure 3:
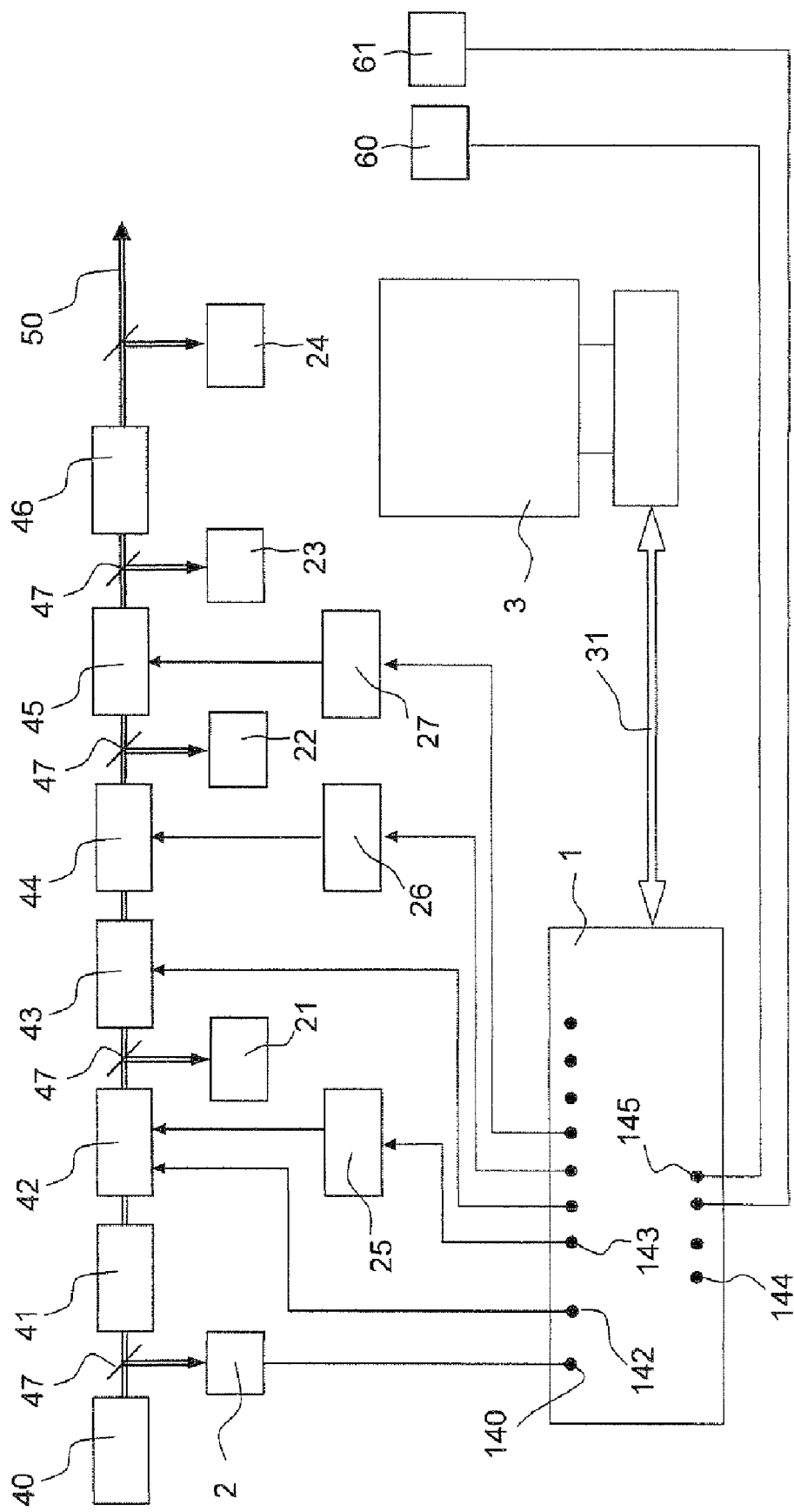
FIG. 3 represents a laser subsystem incorporating a device according to the invention.

As a nonlimiting example, FIG. 3 illustrates a system comprising a synchronization device 1 according to the invention. The device requiring synchronization signals is a laser subsystem emitting ultra-brief pulses. The emitted laser beam 50 is symbolized on FIG. 3 by a double arrow. The subsystem comprises in turn:

an optical oscillator 40 delivering laser pulse trains. Normally, the duration of the pulses is of the order of a few hundred femtoseconds and they are emitted at high repetition frequency, the order of magnitude of this first frequency is a few tens of megahertz. This repetition frequency is of very high stability;

a first optical device 41 with diffraction array, also called "stretcher", for temporally expanding femtosecond pulses. The duration of the pulses is thus multiplied by a factor of between 1000 and 10 000. By thus expanding the pulse, its peak power, which is considerable at the subsystem output, is correspondingly diminished. It can then be amplified greatly in complete safety for the various optical elements of the subsystem;

a first amplifier called a regeneration amplifier 42 for supplying from the pulses taken from the "stretcher", pulses in a determined optical mode having a higher energy. These pulses are delivered with a low repetition frequency, of between 1 hertz and 500 kilohertz;

a Pockels cell device 43 making it possible to limit the noise of the pulses by strictly limiting their temporal duration;

a laser pulse preamplification 44 and amplification 45 assembly;

finally, a second diffraction array device 46, also called "compressor", enabling the temporal compression of the pulse so as to return it to its original temporal duration and so increase its peak power.

Of course, depending on the requirements, this subsystem can contain fewer optical elements, the Pockels cell device is not, for example, absolutely necessary. The subsystem can also include other optical elements, it can also have an amplification channel or several channels arranged in parallel.

In order to have geometrical, photometric and spectroscopic data and characteristics on the emitted pulses, samples are taken at various places on the laser subsystem. These samples are taken by means of semi-reflecting blades 47 placed along the optical beam 50 and the duly sampled light beams are sent, for example, to measurement photodiodes 2, 22 and 24, ultra-high-speed cameras, called "streak cameras" 21 and 23, oscilloscopes, and so on. Thus, it is possible to send to the photodiode 2 a part of the laser pulse train taken from the optical oscillator 40. The electrical signal taken from said photodiode is then supplied to the clock input 140 of the synchronization device 1 according to the invention. From this signal, the synchronization device 1 delivers:

a first periodic synchronization signal $S_0$ being used as a timebase reference, said signal having its own repetition frequency. Said signal is supplied to an electronic output called a reference output 142 and controls the triggering of the first amplifier called the regeneration amplifier 42 by means of a trigger device 25;

a plurality of second periodic synchronization signals $S_{SYNC}$, said second signals being offset by a programmable time relative to the first synchronization signal and also having programmable repetition frequencies, said second signals being supplied to electronic outputs called programmed delay signal outputs 143 and controlling the various optical elements of the subsystem by means of trigger devices 26 and 27.

The synchronization device 1 also has control means making it possible to deliver control signals for electronic devices or for electromechanical devices 60 or to receive control signals coming from security systems 61, said signals being delivered to electronic control outputs 145.

All the parameters of the synchronization device are managed by means of a microcomputer 3 via an interface 31 represented by a double arrow in FIG. 3.

In the event of failure of the oscillator, the external clock signal disappears. In this case, the security device is activated. The internal clock replaces the external clock to continue activating certain components. They are thus kept at temperature. Other components, like certain amplifiers, are disconnected to avoid an abnormal overheating of their amplification bar.

The invention claimed is:

1. A laser subsystem comprising:
a local oscillator emitting an optical beam in the form of laser pulse trains;
an energy amplification subsystem;
spatially and temporally formatting arrangement formatting the optical beam;
and controlling, monitoring and measuring arrangement, said subsystem further comprises:
a semi-reflecting optical splitter placed at the output of the local oscillator;
a photodiode placed on one of the channels of said splitter so as to receive a part of the optical beam, said photodiode delivering an electrical signal representative of said optical beam; and
and a device for generating synchronization signals, the electrical signal taken from the photodiode being used as a clock signal for said device or said subsystem, the synchronization signals $S_{SYNC}$ taken from said device or from said subsystem being used to synchronize various optoelectronic elements of the subsystem, wherein the said device comprises:
an internal clock emitting an internal clock signal oscillating at a second frequency roughly identical to a first frequency;
electronic security management arrangement activating the following functions:
"PARTIAL STOP": the optoelectronic elements presenting a danger or likely to be damaged by a prolonged stoppage are switched off;
"CLOCK ACTIVATION": the internal clock is activated and replaces an external clock so that the synchronization signals essential to the correct operation of the subsystem are again activated correctly;
"DISPLAY": failure messages are displayed;
"LIMIT TIME" all the components of the subsystem are stopped when the failure time of the external clock signals is greater than or equal a predetermined external clock is greater than or equal to a predetermined time.

* * * * *